July 14, 1931.  R. D. MERSHON  1,814,174
METHOD OF OPERATING ELECTROLYTIC APPARATUS
Filed Nov. 3, 1919   2 Sheets-Sheet 1
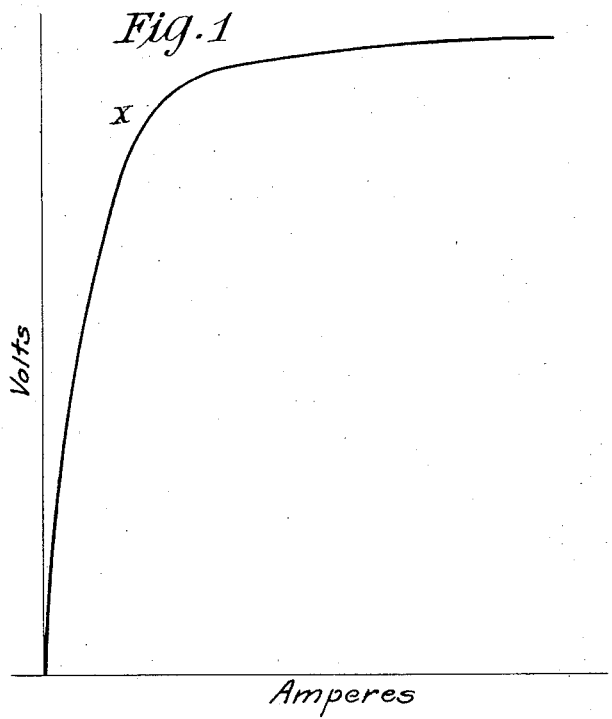
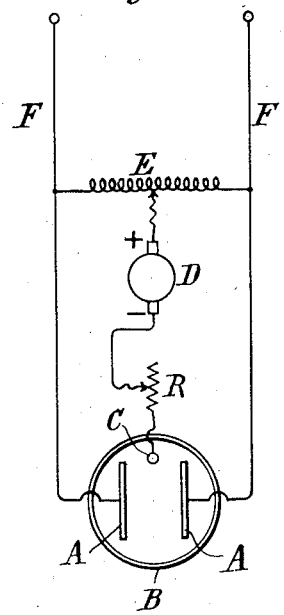
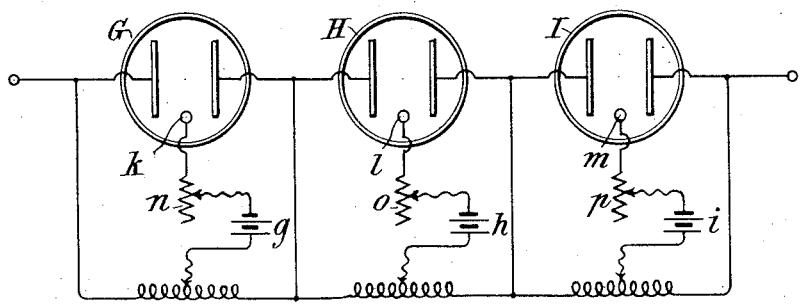
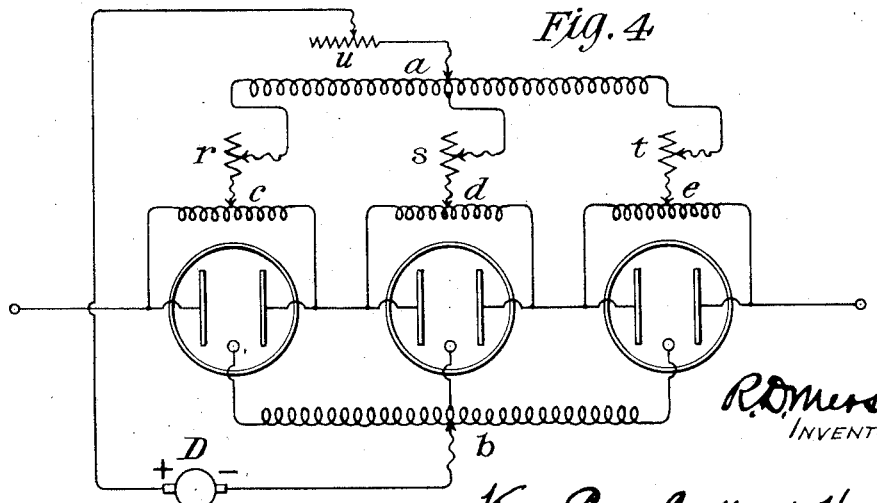

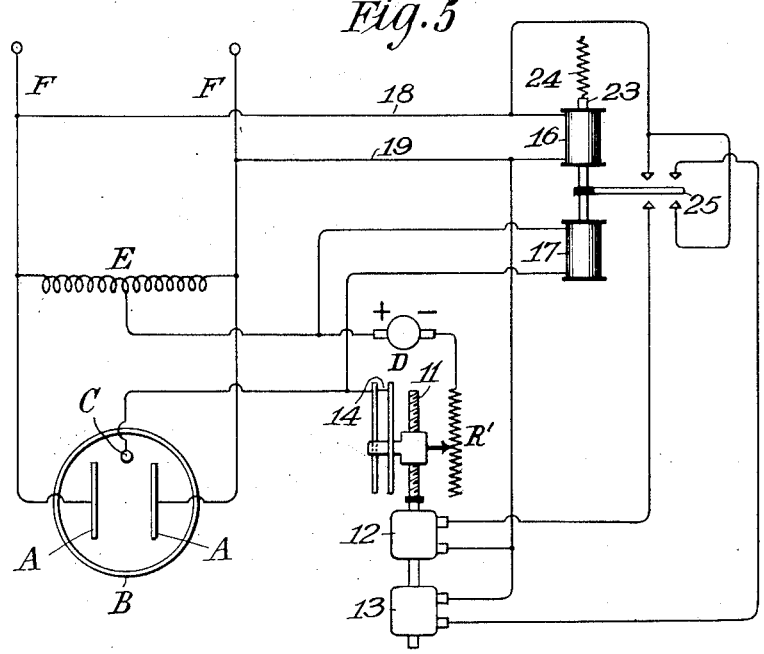
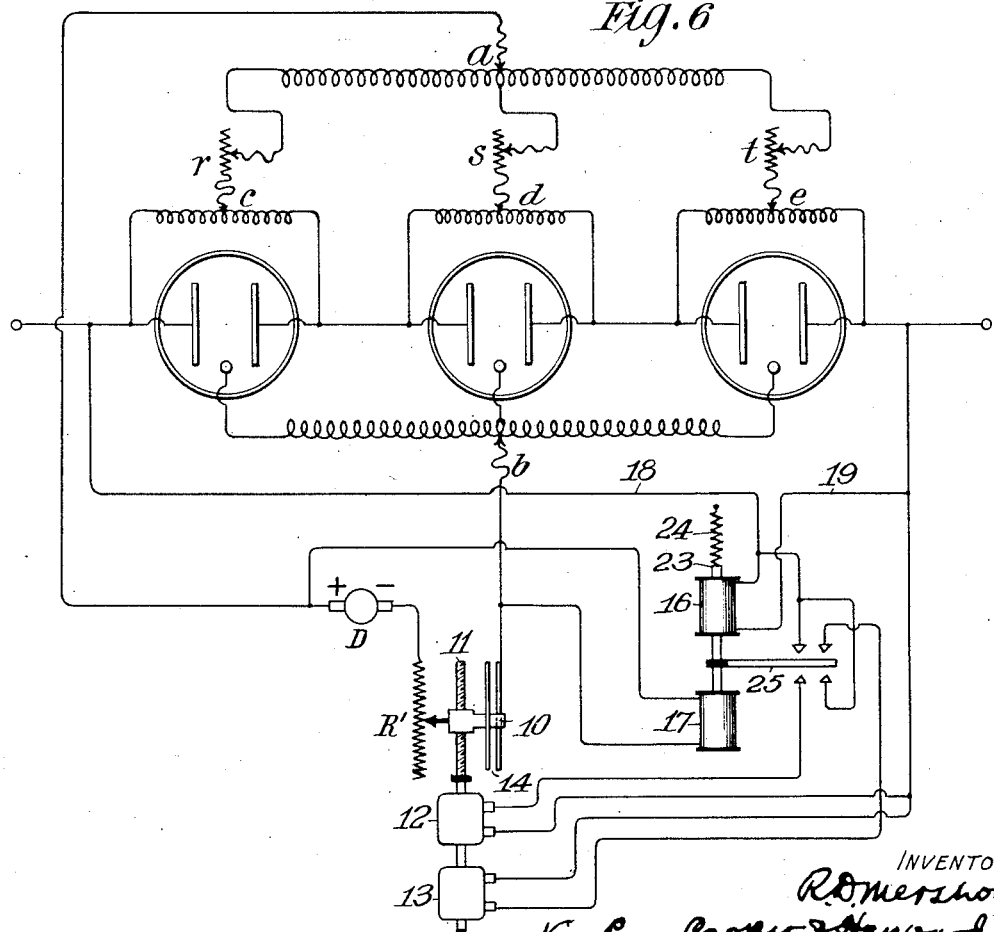

Patented July 14, 1931

1,814,174

UNITED STATES PATENT OFFICE

RALPH D. MERSHON, OF NEW YORK, N. Y.

METHOD OF OPERATING ELECTROLYTIC APPARATUS

Application filed November 3, 1919. Serial No. 335,379.

This invention relates to electrolytic apparatus, particularly condensers and rectifiers, in which the active electrodes are composed of aluminum, magnesium, tantalum or other suitable metal or metallic alloy covered with a dielectric and insulating film. It is upon the existence of this film that the operation of the electrolytic apparatus depends, for the film possesses the property of offering little or no resistance to the flow of current from the electrolyte to the metal but of strongly opposing the flow of current from the metal to the electrolyte. The object of the invention, briefly stated, is to provide, first, a method of operation by which the electrostatic capacity of the apparatus will be maintained substantially constant; second, to provide a method of operation by which harmonics of the E. M. F. waves impressed upon the apparatus will be eliminated or greatly diminished; and third, a method of operating electrolytic units in series to maintain a desired balance or other desired relation between the voltages taken by the units.

The film above mentioned is formed by immersing the metal sheet or plate in a suitable electrolyte (for example a solution of borax and boric acid in water) and passing current from the plate to the solution. Within certain limits, the higher the voltage impressed upon the plate in the forming operation, the greater the insulating properties of the film, and in the course of a long investigation of electrolytic condensers, I have observed that the electrostatic capacity of the condenser varies substantially inversely as the voltage employed in forming the film. In short the behavior is as if the thickness of the film were substantially a direct function of the forming voltage,—that is, the higher the forming voltage (within certain limits, as will be explained hereinafter) the thicker the film and the less the electrostatic capacity,—and it is to be understood that the word "thickness" is used with that meaning in what follows.

In the accompanying drawings,

Fig. 1 is a curve representing the relation of voltage impressed upon a filmed electrode to current passed by the film.

Fig. 2 is a diagram explanatory of the "excited" electrolytic condenser, and illustrating the present invention applied thereto.

Fig. 3 is a diagram showing three excited condensers connected in series in the usual manner, each with its own exciting source, and illustrating the present invention applied thereto.

Fig. 4 is a diagram showing three excited condensers connected in series in the manner described in my Patent No. 1,439,526, with a common exciting source, and illustrating the present invention applied to such a system.

Fig. 5 is a diagram illustrating a scheme for automatic regulation of the exciting voltage on a single condenser.

Fig. 6 is a diagram illustrating the scheme shown in Fig. 5, applied to several condensers connected in series and having a common source of exciting current.

When in forming the film on a sheet or plate, the voltage is first impressed, the current passed is relatively large but diminishes rapidly as the film forms; the rate of diminution becoming less and less with time until it becomes so low that the current is substantially constant and relatively small. If now the impressed voltage be increased a similar effect will be observed; the current will increase greatly but will diminish toward a limiting value as the film "thickens". This action, however, is not unlimited, for as the voltage is raised a limit is reached beyond which an increase in the thickness of the film is not produced; or if it is, it requires an indefinitely long time for its accomplishment. For convenience the voltage beyond which the thickness of the film does not increase may be termed the "critical" forming voltage of the film.

If a film be formed with a forming voltage as high as or higher than its critical voltage for sufficient time for substantially steady conditions to be reached, the voltage and current curve of the after performance of the film will be like that shown in Fig. 1 of the drawings in which it will be seen that the current passed by the film increases slowly in comparison with the voltage until the voltage reaches the knee of the curve. Somewhere near the knee, about at the position indicated by $x$, is the critical value of the forming voltage. This is not, in general, a sharply defined point, for the lower portion of the curve is not straight but is slightly curved, the curvature increasing as the voltage increases. In other words, for working voltages up to the critical voltage the film allows comparatively little current to leak through it. The electrical stress exerted on the film, by a voltage tending to produce a current through the film, is termed the "film stress", and is directly proportional to the voltage.

Assume now that the forming voltage has been kept below the critical value and that the plates so filmed are in use in a rectifier or a condenser, for example on a commercial alternating current supply circuit. So long as the film stress is below the voltage used in forming the films, the latter undergo substantially no further thickening, and in the case of a condenser the electrostatic capacity does not decrease materially if at all, but if the film stress be increased the film-formation begins again and the films thicken, continuing to do so as the voltage is raised until the film stress passes the critical value. On such a circuit there is always a possibility that the action of the condenser, in cooperation with the reactance of the circuit, may result in accentuating such higher harmonics as may exist in the E. M. F. wave of the generator supplying the circuit, and may thereby increase the maximum value of the E. M. F. wave impressed upon the condenser. The film would then thicken or form up to a point corresponding to the maximum voltage and the electrostatic capacity of the condenser would be decreased. On the other hand, if the maximum value of the E. M. F. wave is always less than the voltage at which the film was formed the film will eventually become thinner and the electrostatic capacity will be increased.

According to the present invention, variation in the insulating and dielectric properties of the film, and consequent variation in electrostatic capacity, may be prevented by operating the apparatus with a film stress which is substantially constant and is preferably, but not necessarily in all cases, at or near the critical voltage of film-formation.

The critical voltage of film-formation is not invariable, though my experience indicates that it has a maximum value. By introducing into the metal one or more other substances, as copper, silicon, or iron, or by introducing into the electrolyte one or more other compounds, for example sodium chlorid or sulfate, the critical forming voltage may be lowered. Accordingly, knowing the voltage to which the apparatus is to be normally subjected, I can by the above expedient select the corresponding critical voltage and form the films up to that value. The electrostatic capacity of the condenser and the resistance of its films will then remain substantially constant in use, and if harmonics appear at the terminals of the apparatus they cannot cause the film to thicken. They can, however, cause an increase in the leakage current through the films; and since, in general, a very small amount of energy current due to harmonics will cause them to fade away or be greatly diminished, the harmonics will largely disappear.

The preceding applies to electrolytic apparatus generally. When, however, we come to deal with the excited electrolytic condenser, the application of the foregoing principles is especially convenient, for the exciting voltage is itself entirely effective for keeping the film stress at practically any value we please. In explanation of what is meant, generally, by an "excited" condenser, reference is here made to Fig. 2 of the accompanying drawings, in which A, A represent two filmed electrodes (or anodes, as they may be conveniently termed) of an excited electrolytic condenser, immersed in an electrolyte contained in a vessel or tank B. C is a cathode, composed of conducting but non-filming material, as nickel or carbon, immersed in the electrolyte and connected to the negative pole of a source D of unidirectional current. The other pole of this source is connected to the neutral point of an auto-transformer or balance coil E connected across the condenser terminals or leads F. As explained in my prior Patent No. 1,077,628, the current from the source D "excites" the condenser by supplying and maintaining a negative charge in the electrolyte. Since the maximum film stress is that corresponding to the sum of the unidirectional voltage and one half the maximum value of the alternating voltage wave we can, by adjusting the voltage impressed by the source D, as for example by means of the variable resistance R, exert on the films any film stress desired, and hence we can have at all times a film stress corresponding to or higher than the critical voltage. It is seen from the last sentence that the film stress is compounded of the two voltages, being at any instant the algebraic sum of the exciting voltage and one-half the instantaneous value of the alternating voltage, and that the film stress is therefore pulsating.

When two or more units of electrolytic apparatus are operated in series there is a tendency for the voltages impressed on them to become unbalanced, or to depart from the desired relation between such voltages. For instance, one condenser may become hotter than the other, and its capacity will accordingly be increased. It will then take less voltage and the other must therefore take more. The films in the latter will begin to thicken, causing the condenser to take still more voltage and causing still more thickening, and so on. While this is going on the hotter condenser is taking less and less voltage, and in course of time its films become thinner, thus further increasing its capacity. According to the present invention I would make the operating film stress in each condenser not materially lower than, and preferably substantially equal to, the critical forming voltage of the films. Then if the films in either condenser had not originally been formed up to their critical forming voltage, the operating film stress will form them up to that point. Thereafter no material if any variation in film-thickness could occur. Moreover, if for any reason, as difference in temperature, the voltage ratio should be changed, the increase of voltage taken by the cooler unit would not be used up in additional film-formation but would be passed as work current and the resulting loss, appearing as heat, would raise the temperature and eventually bring it up to the temperature of the other. Or, if for any reason it is desirable to have the film stress below the critical forming voltage, I would keep the film stress substantially constant at such lower value. The production of a film stress of any suitable value, for example about equal to the critical voltage can be conveniently secured by the method illustrated in Figs. 3 and 4. In the former the three condensers G, H, I, are connected in series in the customary way, with individual exciting sources $g$, $h$, $i$, respectively, connected to the exciting cathodes $k$, $l$, $m$, through variable resistances $n$, $o$, $p$, so that each condenser may at all times have a film stress near to or greater than the critical value, as desired. In Fig. 4 the exciting voltage is distributed by means of the balance coils $a$, $b$, $c$, $d$, $e$. Between coils $a$ and the coils $c$, $d$, $e$, and between the exciting source D and coil $a$, variable resistances $r$, $s$, $t$, $u$, respectively, are provided to adjust the exciting voltage or voltages to the desired value or values. Resistance $u$ may be omitted if desired; or resistances $r$, $s$, $t$, may be omitted, especially if the several units all have the same critical voltage. In all three figures the connections from the exciting sources to the balance coils are variable so that in each case the connection can be made exactly at the neutral point or at a position sufficiently near thereto.

Maintenance of the dielectric and insulating properties of the films substantially constant may be desirable for other reasons than those indicated above, as, for example, it may be desirable to have a given alternating voltage produce always the same losses. For example, if voltage $x$ with accompanying losses $y$ be increased to $x+h$ with losses $y+k$, it may be desirable, upon returning to voltage $x$, to have the original losses, $y$. This object can be attained by keeping the operating film stress substantially constant even though the impressed alternating voltage be varied. Adjustment of the exciting voltage is a convenient method for the purpose, the exciting voltage being increased as the alternating voltage is decreased, and vice versa. In the latter case, however, care should be taken to keep the exciting voltage up to at least half the maximum value of the alternating E. M. F. wave impressed at the time, since at a lower value of the exciting voltage the film stress will periodically "reverse", as explained in my prior Patent No. 1,077,628, mentioned above.

Adjustment of the exciting voltage for the above and for other purposes can be effected in a variety of ways, as by adjustment of the resistance of the exciting circuit, or varying the resistance of the field circuit of the generator supplying the exciting current. Such adjustments can be made manually or automatically. A convenient method of automatic control is illustrated in Figs. 5 and 6, of which Fig. 5 shows the scheme applied to one condenser and Fig. 6 to a plurality of condensers connected in series and excited from a common source.

In these figures one terminal of the resistance R' is carried by a nut 10 on an endless screw 11 rotated in one direction by a small motor 12 and in the other direction by another motor 13. The nut slides between two conducting bars 14 by which it is prevented from rotating and by which it is electrically connected with the cathode or cathodes. Two solenoids 16 and 17 are provided, the first connected across the main leads of the condenser by wires 18, 19, and the other across the exciting source D by wires 21, 22. The solenoids have a common core 23, which is raised by a spring 24 and carries an arm 25 between two pairs of contacts. If the alternating voltage on the main terminals rises above a predetermined value the increased pull of the upper solenoid draws down the core and brings arm 25 against the lower contacts. Motor 12 now receives current and operates to lower the nut 10, thereby cutting in more of the resistance R'. This decreases the voltage from the source D on both the condenser and the solenoid. When the exciting voltage has diminished to the desired value the decreased voltage on the solenoid 17 (which is properly designed for the purpose) so decreases the pull of the latter that the two solenoids combined are no longer able to overcome the tension of the spring 24, and the core is therefore raised to the neutral position. The circuit of motor 12 is thus broken and the nut 10 is arrested. On the other hand, if the voltage on the condenser terminals falls below a predetermined value the decreased pull of solenoid 16 allows the core to be raised, thus closing the upper contacts. Motor 13 now receives current and operates to raise the nut 10, which cuts resistance out of the two circuits supplied by the source D. The exciting voltage is thus increased, and also the voltage on solenoid 17. When the exciting voltage reaches the proper value the increased pull of the solenoid draws down the core to the neutral position and stops the motor. In this way the exciting voltage is adjusted automatically, in response to variations of the alternating voltage on the main terminals, in such manner that the maximum film stress on the films is kept substantially constant. This adjustent of the exciting voltage is inverse to the variation of the alternating voltage, in the sense that the former is increased when the latter decreases, and vice versa, but it will be readily seen that the ratio of the new exciting voltage to the original is not necessarily the exact inverse of the ratio of the alternating voltages. Upon reflection it will be clear that in order to keep the maximum value of the film stress constant the exciting voltage must be increased (or decreased, as the case may be) by one half of the change in the alternating voltage. In the appended claims I have used the term "inversely" in the above sense, that is, merely to indicate that the exciting voltage is raised when the alternating voltage is decreased, and vice versa.

It is to be understood that the invention is not limited to the specific details herein described, but can be practiced in other ways without departure from its spirit.

I claim:—

1. In the art of operating electrolytic apparatus having filmed electrodes, the improvement which consists in operating with a film stress not materially lower than the critical forming voltage of the films.

2. In the art of operating electrolytic apparatus of the excited type having filmed electrodes and having a variable alternating voltage impressed thereon, the improvement which consists in operating with the values of the alternating and exciting voltages so related as to give a film stress not materially lower than the critical forming voltage of the films.

3. In the art of operating electrolytic apparatus of the excited type having filmed electrodes, and having a variable alternating voltage impressed thereon, the improvement which consists in operating with the values of the alternating and exciting voltages so related as to make the maximum of the film stress substantially constant.

4. In the art of operating electrolytic apparatus of the excited type having filmed electrodes and having a variable alternating voltage impressed thereon, the improvement which consists in varying the exciting voltage inversely to the alternating voltage, to produce in the apparatus a film stress of substantially constant maximum.

5. In the art of operating a plurality of electrolytic units connected in series and having filmed electrodes, the improvement which consists in operating with a film stress not materially lower than the critical forming voltage of the films.

6. In the art of operating a system of electrolytic units connected in series, the improvement which consists in maintaining in the several units of the system a substantially constant film stress substantially equal to the critical forming voltage of the films.

7. The improvement in the art of operating a system of electrolytic units of the excited type connected in series, on which a variable alternating voltage is impressed, the improvement which consists in operating with the values of the alternating and exciting voltages so related as to give a film stress not materially lower than the critical forming voltage of the films.

8. In the art of operating a system of electrolytic units of the excited type connected in series, on which a variable alternating voltage is impressed, the improvement which consists in operating with the values of the alternating and exciting voltages so related as to give a film stress of substantially constant maximum.

9. In the art of operating a system of electrolytic units of the excited type connected in series, on which a variable alternating voltage is impressed, the improvement which consists in varying the exciting voltage inversely to the alternating voltage, to maintain in the system a substantially constant film stress substantially equal to the critical forming voltage of the films, for preventing variation in the relation between the voltages taken by the several units of the series.

10. The method of operating an electrolytic, film-forming condenser on an alternating-current circuit, which comprises applying a unidirectional-current excitation of such value that the impressed voltage on the film has the maximum value that will not permit an excessive leakage flow.

11. The method of operating an electrolytic, film-forming condenser on an alternating-current circuit having a variable voltage, which comprises applying a unidirectional-current excitation and varying said excitation inversely with respect to variations in the voltage of the alternating-current circuit.

12. The method of operating an electrolytic, film-forming condenser on an alternating-current circuit having a variable voltage, which comprises applying a unidirectional-current excitation and varying said excitation inversely with respect to variations in the voltage of the alternating-current circuit in such manner as to maintain the capacitance of the condenser substantially constant.

13. The method of operating an electrolytic, film-forming condenser on an alternating-current circuit having a variable voltage, which comprises applying a unidirectional-current excitation and varying said excitation in such manner that the maximum voltage impressed on the film has a substantially constant value.

14. The method of operating an electrolytic, film-forming condenser on an alternating-current circuit having a variable voltage, which comprises applying a unidirectional-current excitation and varying said excitation in such manner that the maximum voltage impressed on the film has a substantially constant value, which approximates the value at which excessive leakage current begins to flow.

15. The method of operating an electrolytic, film-forming condenser on an alternating-current circuit, which comprises applying a unidirectional-current excitation of such value that the maximum voltage impressed on the film has a substantially constant value, which approximates the value at which excessive leakage current begins to flow.

In testimony whereof I affix my signature.

RALPH D. MERSHON.